No. 734,409. PATENTED JULY 21, 1903.
A. B. DU PONT & G. J. KOBUSCH.
CAR CONSTRUCTION.
APPLICATION FILED APR. 6, 1903.
NO MODEL.
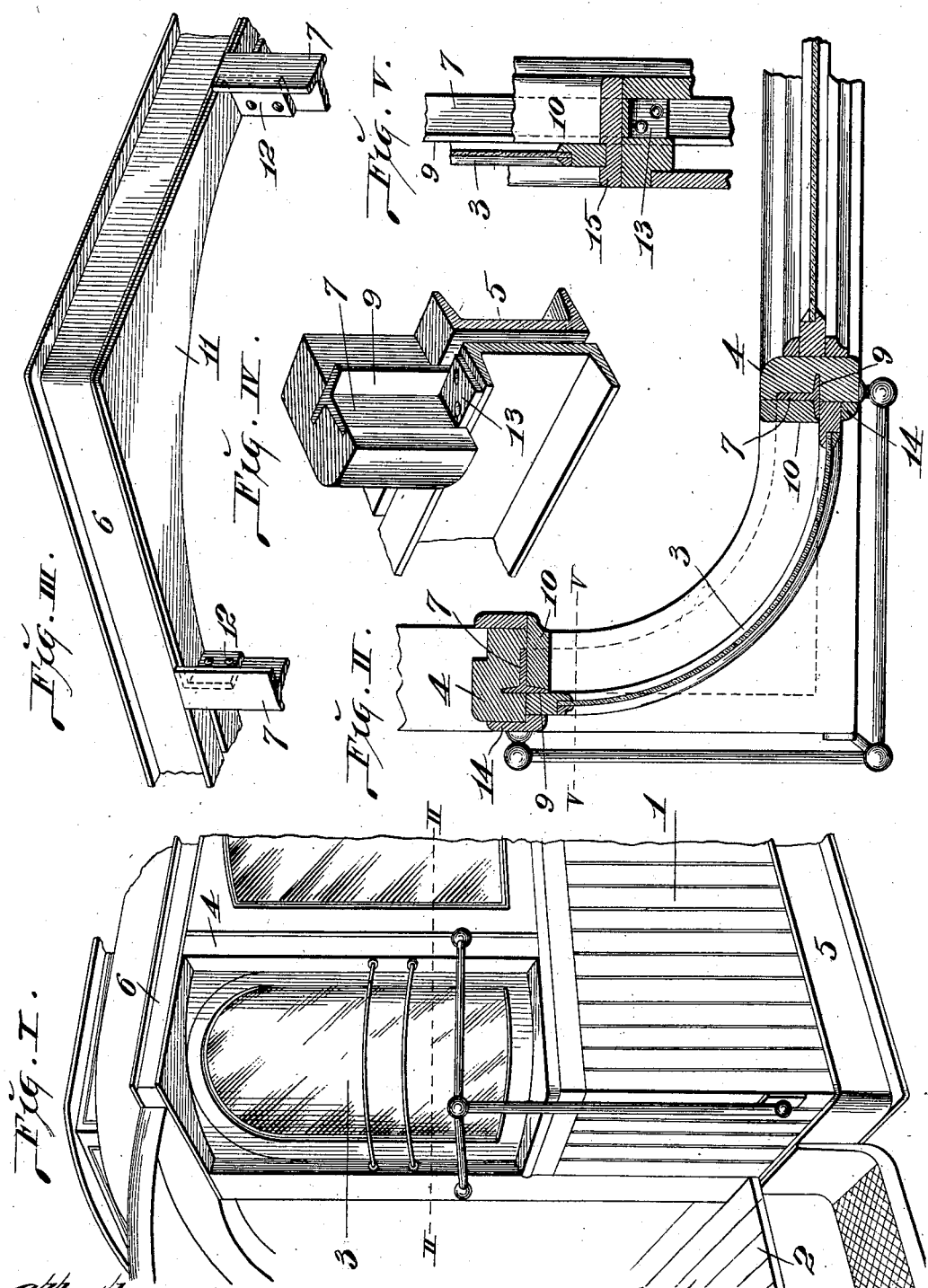
Attest:
M. P. Smith
E. S. Knight
Inventors:
Antoine B. Du Pont,
& George J. Kobusch.
By Wright Bro
Atty's.

No. 734,409. Patented July 21, 1903.

UNITED STATES PATENT OFFICE.

ANTOINE B. DU PONT AND GEORGE J. KOBUSCH, OF ST. LOUIS, MISSOURI.

CAR CONSTRUCTION.

SPECIFICATION forming part of Letters Patent No. 734,409, dated July 21, 1903.

Application filed April 6, 1903. Serial No. 151,244. (No model.)

*To all whom it may concern:*

Be it known that we, ANTOINE B. DU PONT and GEORGE J. KOBUSCH, citizens of the United States, residing in the city of St. Louis, in the State of Missouri, have invented certain new and useful Improvements in Car Constructions, of which the following is a full, clear, and exact description, reference being had to the accompanying drawings, forming part of this specification.

The object of our invention is to provide in a substantial and neat manner for windows at the corners of a car-body, so that the conductor or other person running the car can see when inside of the car, when the passengers have mounted the steps upon taking the car and alighted from the steps upon leaving the car. With cars as now constructed it is extremely difficult for the conductor who is on the inside of a crowded car collecting fares to tell just when a passenger or the last of a number of passengers has mounted the steps so that the car can be started, and it is equally difficult to tell just when a passenger has left the step when getting off of a car, and the conductor is liable to start the car either a little too soon or to allow it to remain standing a little too long, this latter resulting in an unnecessary delay of the car in making its trip. By constructing a car in accordance with our invention the conductor has a clear view of the end of the platform of the car that is used by the passengers in getting off and on, and he is able to start the car promptly when the passengers have mounted and alighted from the step. Each of the four corners of a car may be provided with one of these windows or the windows may only be provided at the corners of a car where passengers mount and leave the car.

Our invention consists in features of novelty hereinafter fully described, and pointed out in the claims.

Figure I is a detail perspective view showing one corner of a car-body with our improvement applied. Fig. II is an enlarged horizontal section taken on line II II, Fig. I. Fig. III is an enlarged detail perspective view showing the portion of the roof of a car-body that is directly over the position occupied by the corner-window, as is contemplated by our invention. Fig. IV is a detail perspective view showing part of one of the lower sills and part of one of the window-posts of the car-body. Fig. V is a detail vertical section taken on line V V, Fig. II.

Referring to the drawings, 1 represents part of the car-body, and 2 part of one of the platforms of the car. The body and platform, except as modified by our invention, may be of any well-known form of construction.

3 represents a window-sash located in the corner of the car that is adjacent to the end of the platform used by passengers in getting on and off of the car. This window-sash is preferably oval or semicircular in shape and extends from the central portion of the car-body to the under side of the car-roof.

In order to provide the requisite strength and durability to the car structure, notwithstanding the presence of the corner-window, we use two posts or stiles 4, that extend from the body-sills 5 of the car to the roof 6, one of the posts being located in the side of the car-body and the other in the end of the car-body, and to the inner faces of these posts are fitted T-irons 7, that also extend from the roof to the sills 5. The flange and one half of the base of each T-iron is set into its post, as shown in Fig. IV, while the other half, 9, of each T-iron extends into the window-space and forms the backing for the window-sash 3, as seen in Fig. II, the inner walls of these parts 9 of the T-irons being covered, preferably, by means of facing-strips 10. The upper ends of the T-irons are connected together and to the roof of the car by means of a plate 11, having downturned ends 12, that are riveted to the T-irons, as shown in Fig. III. The lower ends of the T-irons are made fast to the body-sills 5 by the ends 13 of the flanges being turned into a horizontal position and riveted or otherwise secured to the sill, as shown in Figs. IV and V.

14 represents strips secured to the posts 4 outside of the window-sash, and 15 represents a lower strip, against which the bottom of the window-sash fits.

We claim as our invention—

1. As a new article of manufacture, a car-body having a window located in and forming part of one corner of the car-body, and in advance of which is located the step and platform of the car-body, substantially as set forth.

2. A car-body having posts located in the side and end thereof, and a corner-window occupying the space between the posts and in advance of which is located the step and platform of the car-body, substantially as set forth.

3. A car-body having posts located in one side and end of the body, a corner-window occupying the space between the posts and T-irons set into said posts and connected to the sill and roof of the car-body, substantially as set forth.

A. B. DU PONT.
GEORGE J. KOBUSCH.

In presence of—
JOHN H. CARROLL,
M. H. MURPHY.